(12) United States Patent
Fischer

(10) Patent No.: US 8,325,610 B2
(45) Date of Patent: *Dec. 4, 2012

(54) SYSTEM AND METHOD FOR MEDIUM ACCESS CONTROL IN A POWER-SAVE NETWORK

(75) Inventor: Matthew J. Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1262 days.

This patent is subject to a terminal disclaimer.

(21) Appl. No.: 11/865,962

(22) Filed: Oct. 2, 2007

(65) Prior Publication Data
US 2008/0031175 A1 Feb. 7, 2008

Related U.S. Application Data

(63) Continuation of application No. 10/770,171, filed on Feb. 2, 2004, now Pat. No. 7,324,468.

(60) Provisional application No. 60/501,781, filed on Sep. 10, 2003.

(51) Int. Cl.
*G01R 31/08* (2006.01)
(52) U.S. Cl. ........................... 370/236; 370/331
(58) Field of Classification Search ............... 370/311, 370/236, 331
See application file for complete search history.

(56) References Cited

U.S. PATENT DOCUMENTS

| | | | |
|---|---|---|---|
| 4,506,360 A | 3/1985 | Kryskow et al. | |
| 5,644,576 A | 7/1997 | Bauchot et al. | |
| 5,657,317 A | 8/1997 | Mahany et al. | |
| 6,463,307 B1 * | 10/2002 | Larsson et al. | 455/574 |
| 6,463,542 B1 * | 10/2002 | Yu et al. | 713/320 |
| 6,834,045 B1 | 12/2004 | Lappetelainen et al. | |
| 6,879,579 B1 | 4/2005 | Myles et al. | |
| 2002/0131484 A1 | 9/2002 | Diepstraten | |
| 2003/0224787 A1 * | 12/2003 | Gandolfo | 455/434 |
| 2005/0025174 A1 * | 2/2005 | Fischer et al. | 370/445 |

OTHER PUBLICATIONS

Draft Supplement to Standard for Telecommunication and Information Exchange Between System, LAN-MAN Specific Requirements. Part 11 Wireless Medium Access Control (MAC) and Physical Layer (PHY) Specifications 'Online May 1, 2002 Retrieved from the Internet on Oct. 7, 2004: URL: http//cygnus.et.put.poznan.pl/{rkotrys/802_11/802.11e-D3_draft.pdf>.

(Continued)

*Primary Examiner* — Sai-Ming Chan
(74) *Attorney, Agent, or Firm* — Garlick & Markison; Jessica W. Smith

(57) ABSTRACT

A method and apparatus for accessing, controlling and utilizing a network communication medium. Various aspects of the present invention may comprise a first networked device with power-save capability. The first networked device may acquire control of a communication medium utilizing a medium access protocol, which may be contention-based. The first networked device may utilize the communication medium to communicate information to a second networked device. The first networked device may transfer control of the communication medium to the second networked device, whereby the second networked device may control the communication medium without having to acquire control of the communication medium by utilizing the medium access protocol. The second networked device may utilize the communication medium to communicate information to the first networked device while maintaining control over the communication medium. The second networked device may have buffered such information for delayed delivery to the first networked device.

26 Claims, 5 Drawing Sheets

OTHER PUBLICATIONS

IEEE 802.11-02 604R1 Normative TXTE for TGE Consensus Proposal, Online Sep. 12, 2002, Retrieved from the internet on Oct. 7, 2004: URL: http://grouper.ieee.org/groups/802/11/Documents/D2T601-650.html>.

Woesner H et al: "Power-Saving Mechanisms in Emerging Standards for Wireless LANs: The MAC Level Perspective" IEEE Personal Communications, IEEE Communications Society, US vol. 5, No. 3, Jun. 1, 1998, pp. 40-48.

* cited by examiner

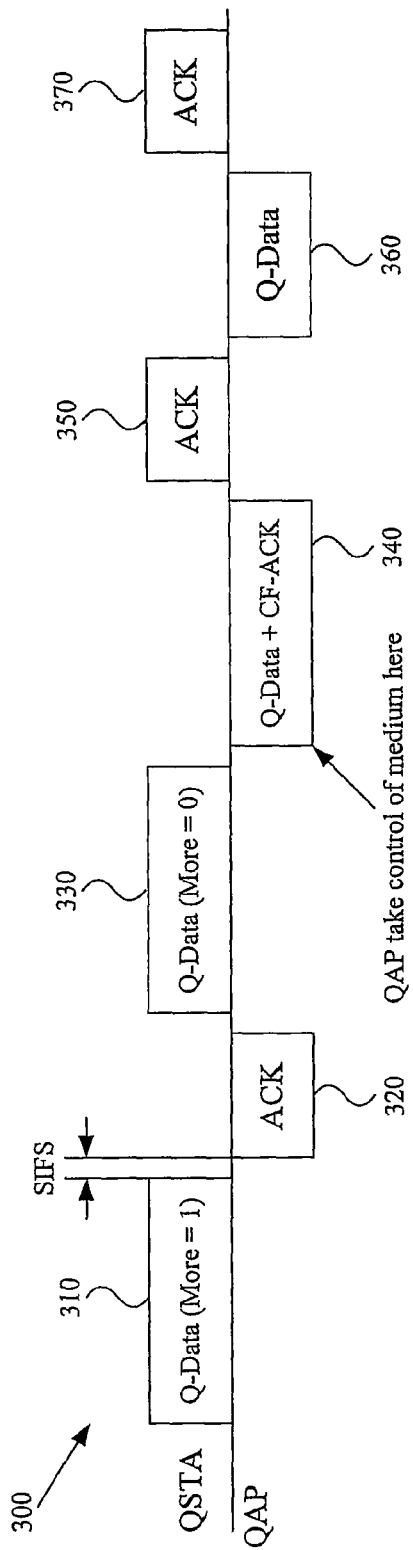
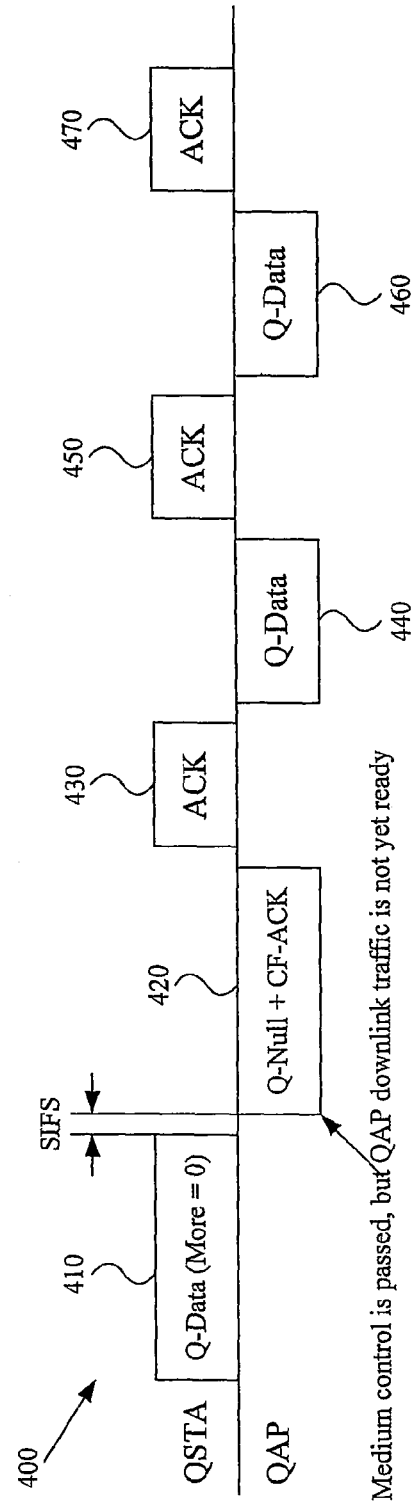
Figure 3
Figure 4

SYSTEM AND METHOD FOR MEDIUM ACCESS CONTROL IN A POWER-SAVE NETWORK

CROSS-REFERENCE TO THE RELATED APPLICATIONS/INCORPORATION BY REFERENCE

This patent application is a continuation of U.S. patent application Ser. No. 10/770,171, filed on Feb. 2, 2004, now U.S. Pat. No. 7,324,468, which makes reference to, claims priority to and claims benefit from U.S. Provisional Application No. 60/501,781, filed Sep. 10, 2003, titled "SYSTEM AND METHOD FOR POWER MANAGEMENT IN A WIRELESS NETWORK". The contents of each of the aforementioned patent applications are hereby incorporated herein by reference in their entirety.

Federally Sponsored Research Or Development

[Not Applicable]

Sequence Listing

[Not Applicable]

Microfiche/Copyright Reference

[Not Applicable]

FIELD OF THE INVENTION

The present invention relates generally to medium access control. More specifically, the present invention relates to method and apparatus for accessing, controlling and utilizing a communication medium in a network.

BACKGROUND OF THE INVENTION

Modern communication networks include a vast array of device types. Such device types may include, for example, wired and wireless devices, and stationary and portable devices. Some networked devices may have relatively limitless electrical power supplies, for example those drawing electrical power from wall outlets. Conversely, some networked devices may have limited power supplies, for example those operating on internal batteries.

Networked devices operating with limited power supplies may adopt operating characteristics that are conducive to conserving their limited supplies of power. For example, some devices may have an operating mode, sometimes called a "sleep mode" or "power-save mode," where the device shuts down or slows down many of its internal functions to conserve energy. Such functions may include, for example, network communication functionality. Such devices may, for example, periodically or on-command exit the power-save mode and re-establish communications with other networked devices.

For example, a remote network device in power-save mode may exit the power-save mode and establish communications with a communication network access point. Once such communications are established, the exemplary remote network device and network access point may exchange information. For example, the remote device may transmit information to the access point that is destined for another networked device, and the access point may transmit information to the remote device that the access point has buffered for the remote device while the remote device was in power-save mode and unable to communicate with the access point.

The process of communicating information between the exemplary remote device and network access point, and between devices in general, consumes energy. Communication networks are generally governed by various communication procedures and protocols that control various communication functions. Such functions may include, for example, access to the communication medium and message queuing. Such communication protocols and other governing rules of information transfer typically include aspects that are inefficient with regard to, for example, power consumption, information transfer speed, and bandwidth utilization.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a method and apparatus for accessing, controlling and utilizing a network communication medium. Various aspects of the present invention may comprise a first networked device with power-save capability. The first networked device may, for example, communicate an indication to various other network devices that the first networked device is capable of operating in a power-save mode.

Various aspects of the present invention may comprise the first networked device acquiring control of a network communication medium utilizing a medium access protocol, which may, for example, be a contention-based medium access protocol. The first networked device may, for example, acquire control of the communication medium after exiting from a sleep state of a power-save mode. The first networked device may utilize the communication medium to communicate information to a second networked device.

Various aspects of the present invention may comprise the first networked device transferring control of the communication medium to the second networked device, whereby the second networked device may control the communication medium without having to acquire control of the communication medium by utilizing the normal rules of the medium access protocol. The first networked device may, for example, transfer control of the communication medium to the second networked device by communicating a hand-off indication to the second networked device. Such a hand-off indication may comprise, for example, an indication that the second networked device may assume control over the communication medium. Following transfer of communication medium control to the second networked device, the first networked device may receive information from the second networked device, if the second networked device has such information to send. Following receipt of information from the second networked device, the first networked device may re-enter a sleep state of a power-save mode.

Various aspects of the present invention may comprise the second networked device assuming control of the communication medium following receipt of a medium control hand-off indication from the first networked device. The second networked device may, for example, accept a medium control hand-off from some networked devices, such as power-save devices, and not from other devices, such as non-power-save devices.

Various aspects of the present invention may comprise the second networked device, having assumed control of the communication medium, utilizing the communication medium to communicate information to the first networked device while maintaining control over the communication medium. The second networked device may, for example, communicate such information to the first networked device in a single data packet or stream of data packets. The second networked device may, for example, have buffered such information for delayed delivery to the first networked device.

These and other advantages, aspects and novel features of the present invention, as well as details of illustrative aspects thereof, will be more fully understood from the following description and drawings.

BRIEF DESCRIPTION OF SEVERAL VIEWS OF THE DRAWINGS

FIG. 3 illustrates a first exemplary message exchange between two networked devices in accordance with various aspects of the present invention.

FIG. 4 illustrates a second exemplary message exchange between two networked devices in accordance with various aspects of the present invention.

DETAILED DESCRIPTION OF THE INVENTION

Figure 1:
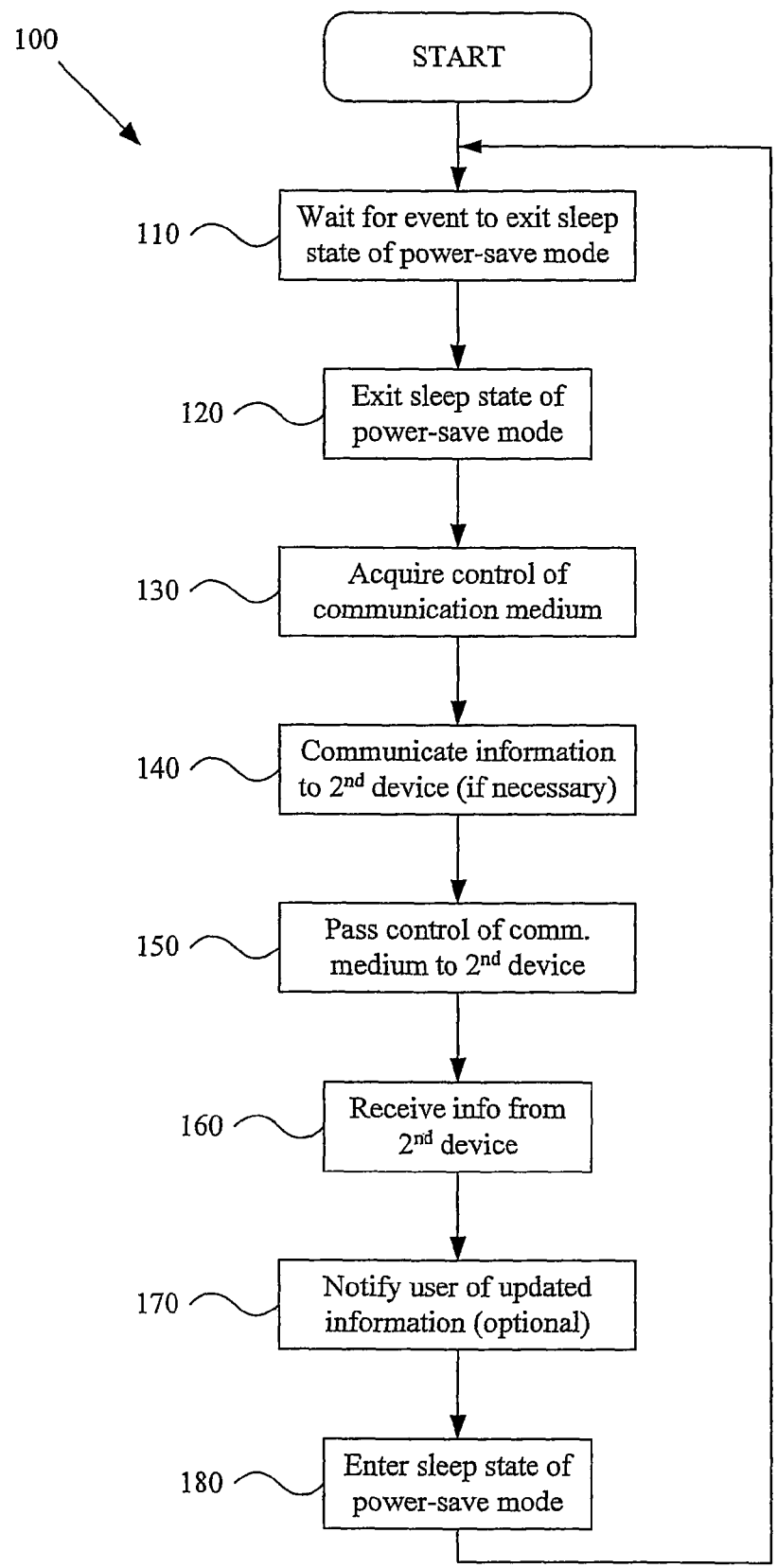
FIG. 1 shows a flow diagram of a method for controlling access to and utilizing a communication medium in accordance with various aspects of the present invention.

FIG. 1 shows a flow diagram of a method 100 for controlling access to and utilizing a communication medium in accordance with various aspects of the present invention. For example and without limitation, the method 100 may be implemented in a first device (e.g., a remote device with power-save capability) in a communication network. For the following discussion regarding FIG. 1, a device implementing the method 100 may be referred to generally as the "first device."

The method 100 includes, at step 110, waiting for an event to exit a sleep state of a power-save mode. Such an event may include, for example, a direct command from a user that requires a networked device operating in the sleep state of the power-save mode to exit the sleep state of the power-save mode. Such an event may include, for example, periodic expiration of a timer. Such an event may, in general, include any event that would cause a device to at least temporarily exit the sleep state of the power-save mode.

The method 100 then includes, at step 120, the first device exiting the power-save mode. The exemplary method 100 illustrated in FIG. 1 incorporates aspects associated with a networked device having power-save capability, because the power-save environment is a convenient environment in which to present some of the various aspects of the present invention. Accordingly, the scope of various aspects of the present invention should not be limited to characteristics of devices having power-save capabilities or a network having devices with power-save capabilities.

The method 100, at step 130, includes the first device acquiring access to and control of the network communication medium. Such access and control may include, for example, access and control of a single communication channel, such as, for example, a FDM frequency, a TDMA timeslot, a frequency hopping sequence, or a CDMA code. Such access and control may include, for example, access and control of a plurality of such communication channels. Such access and control may include, for example, access and control of all communication channels in a communication medium.

Such acquisition may include, for example, utilizing a contention-based medium access protocol to obtain access and control of at least a portion of a shared communication medium. For example, the first device may operate according to a carrier sense multiple access with collision avoidance (CSMA/CA) protocol to obtain control of the network communication medium. The first device may, for example in a wired network, obtain access to the communication medium utilizing a carrier sense multiple access with collision detection (CSMA/CD) protocol. Accordingly, the scope of various aspects of the present invention should not be limited to characteristics of a particular protocol or suite of protocols. Similarly, the scope of various aspects of the present invention should not be limited to characteristics of a particular communication medium or group thereof.

The method 100, at step 140, includes the first device utilizing the communication medium to communicate information to a second networked device. A first device that has no information to communicate to a second networked device may skip step 140. Such information may include, for example, data or control information. Such information may be included in a single data packet or plurality of data packets. Such information may include, for example, unicast, multicast or broadcast information. The information communication may or may not include packet acknowledgement indications from the receiver of the communicated information. Accordingly, the scope of various aspects of the present invention should not be limited to characteristics of particular information format or type. Nor should the scope of various aspects of the present invention be limited to characteristics of a particular communication mechanism.

Note that step 140 may include utilizing typical medium access safeguards, such as time limits, to maintain communication discipline in the communication network. For example, step 140 need not enable the first device to control the communication medium in an uninterrupted fashion until the device has no more information to communicate. Such unchecked control could, in particular scenarios, have detrimental effects on the communication network. Accordingly, for example, the network may place constraints on the duration for which a device or group of devices may maintain control over the communication medium or portions thereof.

The method 100, at step 150, includes the first device passing control of the communication medium to a second networked device. Having received such medium control from the first device, the second device may then utilize the communication medium for communicating information traffic without having to perform various medium access activities, such as, for example, contending with other networked devices for access to the communication medium. For example and without limitation, if the first device communicates information at step 140 to a second device (e.g., a network access point), the first device may, at step 150, pass control of the communication medium to the second device or to some other networked device.

The first device may pass control of the communication medium to a second device in a variety of ways. For example, the first device may communicate an explicit notification to the second device indicating that the second device may assume control over the communication medium. Alternatively, such a notification may be incorporated into a packet that the first device communicates to the second device or another networked device. Such a packet may also include, for example, control information and/or data information. Accordingly, the scope of various aspects of the present invention should not be limited to characteristics of a particular mechanism of passing control of the communication medium.

In an exemplary power-save environment, a remote power-save device may notify a network controlling entity or access point that the power-save device has power-save capability. Then, upon the power-save device sending a packet to the access point indicating that the power-save device has no data or no more data to send, the access point may automatically assume control of the communication medium for sending downstream traffic to the power-save device.

The access point may, for example, distinguish between power-save devices and non-power-save devices in its network and interact with each type of device in a different manner. For example, the exemplary access point may choose not to accept control from the remote device if the access point determines that the remote device does not have power-save capability.

The method 100, at step 160, includes receiving information from the second device, which received control of the communication medium at step 150. Of course, in a scenario where the second device has no information to communicate, step 160 may be skipped. Such information is not to be limited to a particular type of data or data format. For example, such information may take the form of several discrete packets of information, which include data and/or control information. The second device may, for example, communicate one or more discrete packets to the first device while maintaining control of the communication medium.

As mentioned previously with regard to communications from the first device, the network may utilize various mechanisms to ensure that the second device does not retain control of the communication medium for an unduly long period. For example and without limitation, in a communication system that places an upper limit on the time that a particular device may control the communication medium, such a communication system incorporating medium access control in accordance with various aspects of the present invention may place such a limit on the combined time for which the first and second devices may control the communication medium.

In an exemplary power-save network environment, the second device may be a network access point that has buffered traffic destined for the power-save device while the power-save device was in a sleep state of a power-save mode. In general, the second device may include any networked entity that has traffic to deliver to the first device. In a communication scenario where the second device has no information to communicate to the first device, the method 100 flow may by-pass step 160. Note that the scope of various aspects of the present invention should not be limited to receiving a particular type of information or receiving information from a particular type of network entity.

The method 100, at step 170, includes notifying a user of recently transferred information. For example, a remote device may notify the user of the remote device that the remote device has recently received updated information from the network. The user may, for example, control the existence, nature and timing of such a notification. For example, the user may specify that the device is not to notify the user. Alternatively, for example, the user may specify that the device is only to notify the user of updates regarding particular types of information. Accordingly, the scope of various aspects of the present invention is not to be limited to the existence of such a notification or the nature of any notification provided.

The method 100, at step 180, includes the first device re-entering the sleep state of the power-save mode. In the exemplary power-save environment, having exchanged information with the network access point, the first device may re-enter the sleep state of the power-save mode. The method 100 flow may then return to method step 110, where the first device again waits for an event to cause the first device to exit the sleep state of the power-save mode. As mentioned earlier, the power-save network environment is for illustrative purposes and should not limit the scope of various aspects of the present invention to characteristics of power-save devices or networks including such devices.

Figure 2:
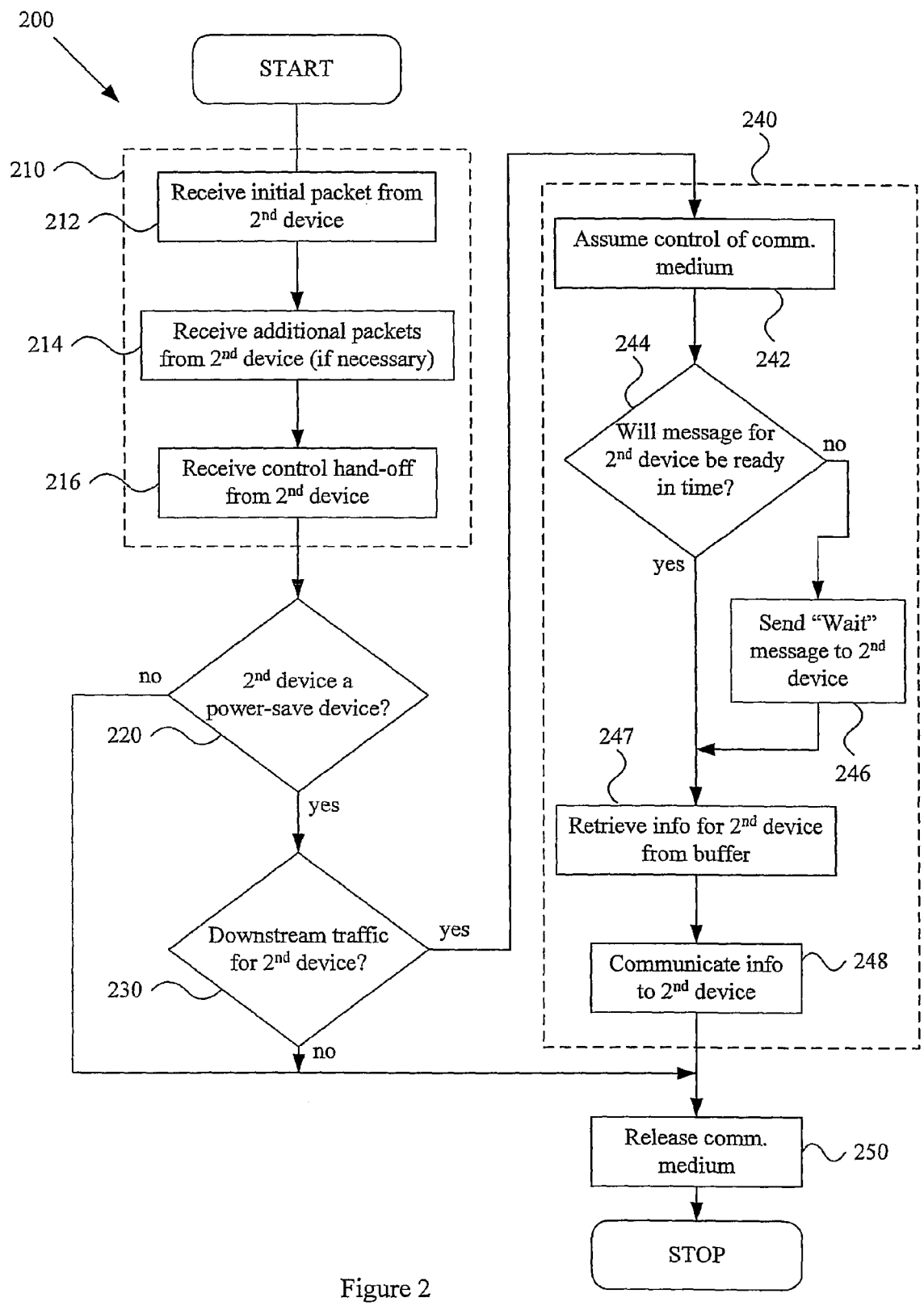
FIG. 2 shows a flow diagram of a method for controlling access to and utilizing a communication medium in accordance with various aspects of the present invention.

FIG. 2 shows a flow diagram of a method 200 for controlling access to and utilizing a communication medium in accordance with various aspects of the present invention. For the following discussion regarding FIG. 2, a device implementing the method 200 may be referred to generally as the "first device." The first device may include, for example and without limitation, an access point device in a communication network. For the following discussion, a device implementing the method 200 may be referred to generally as the "first device."

The method 200, at step 210, includes receiving information from a second device. The second device may have acquired access to the communication medium by performing steps of a medium access protocol (e.g., a contention-based medium access protocol). Step 210 includes various sub-steps, which may or may not be followed by the first device depending on the particular communication scenario. Step 210 may include at step 212, for example, receiving an initial packet from the second device. Step 210 may also include at step 214, for example, receiving additional information packets from the second device.

In one exemplary scenario, the first device may perform step 214 when the second device has more information to communicate to the first device than can reasonably be packaged in a single packet. System packet size constraints may also limit packet size. Step 210 may further include at step 216, for example, receiving an indication from the second device that the first device may assume control of the communication medium. Such an indication may be an explicit directive or may, for example, be an indication that the second device has no data or no more data to send to the first device.

The various information-receiving steps discussed previously are exemplary and should not limit the scope of various aspects of the present invention. For example, the initial packet communicated at step 212 may be the only packet communicated to the first device. That initial packet may, for example, include data information, control information, and the indication that the first device is to take control of the communication medium. Accordingly, the scope of various aspects of the present invention should not be limited to a particular packet or message format or packet stream format.

The exemplary method 200, as will be discussed below, is shown accepting control of the communication medium from network devices having power-save capability and not from network devices that to not have power-save capability. It should be noted that various aspects of the present invention should not be limited to various characteristics of this exemplary model. For example, various aspects of the present invention apply equally well to networked devices that have and do not have power-save capability.

The exemplary method 200, at step 220, includes determining if the second device is a power-save device. Such a determination may be made in a variety of ways. For example, the second device may have previously registered with the network as having power-save capability and may be listed in a database as having such capability. Also, for example, the second device may incorporate indications of its power-save capability in various messages sent by the second device to the first device. Accordingly, the scope of various aspects of the present invention shall not be limited by a particular method of indicating power-save capability or a particular method of determining whether a networked device has power-save capability.

If the second device is not a power-save device, the exemplary method 200 flow continues at step 250, which will be discussed below. If the second device is a device having power-save capability, the method 200 flow continues at step 230.

The method 200, at step 230, includes determining whether there is traffic waiting to be communicated to the second device. For example, the first device, which may for example be a network access point, may have stored message traffic destined for the second device in a buffer. The first device may have performed such storage, for example, if the second device is a registered power-save device. If there is no traffic to be sent to the second device, the exemplary method 200 flow continues at step 250, which will be discussed below. If there is traffic to be communicated to the second device, the method 200 flow continues at step 240.

The method 200, at step 240, includes communicating information traffic to the second device. Step 240 includes various sub-steps, as illustrated in FIG. 2, that may or may not be followed depending on the particular communication scenario. The method 200, at step 242, includes accepting control of the communication medium that was passed from the second device at step 216. By accepting control of the communication medium passed from the second device, the first device may by-pass having to perform various medium access acquisition tasks, such as, for example, contending with other network devices for access to the communication medium. For example and without limitation, if the communication medium is generally governed by a contention-based medium access protocol, the first device may immediately begin communicating information back to the second device instead of having to queue the information and contend for access to the communication medium for each information packet to be sent to the second device.

As discussed previously, the exemplary method 200 does not accept a communication medium control hand-off from a non-power-save device. However, as also discussed previously, the scope of various aspects of the present invention should not be limited to only accepting medium control hand-off from power-save devices.

The method 200, at step 247, includes retrieving information traffic destined for the second device that may have been stored in a buffer. Such information retrieval may have latency that does not provide for meeting the message timing requirements of the system. Accordingly, the exemplary method 200 includes an exemplary mechanism at steps 244 and 246 by which control of the communication medium may be maintained and the second device may be notified that information is coming in spite of such latency. The method 200, at step 244, determines whether the information retrieval latency is too great to meet the communication medium protocol's messaging timing requirements. If step 244 determines that the buffered information will not be retrieved in time to meet the communication medium protocol's messaging requirements, method 200 flow continues to step 246. Step 246, in turn, includes communicating a message over the communication medium to the second device that indicates information will eventually follow. The mechanism discussed above to compensate for information retrieval latency is exemplary. The method 200 may employ a variety of alternative mechanisms to handle such latency. Accordingly, the scope of various aspects of the present invention should not be limited to characteristics of a particular latency handling mechanism.

When the first device has retrieved information destined for the second device, at step 247, and the first device is ready to communicate retrieved information to the second device, the method 200, at step 248, communicates the retrieved information to the second device. The first device may, for example, communicate the information over the communication medium while maintaining control of the communication medium. Step 248 may, for example, communicate the information to the second device in one packet or a plurality of packets. Accordingly, the scope of various aspects of the present invention should not be limited to a particular message or packet format or packet stream format.

After the first device has communicated the information to the second device at step 248, the method 200, at step 250, releases control of the communication medium. Such release may include, for example, communicating an explicit release message or may include, for example, remaining silent for a predetermined period of time in accordance with the rules of medium access for the particular communication medium in use. Accordingly, the scope of various aspects of the present invention should not be limited to a particular medium control release mechanism.

As discussed previously, the communications between the first and second devices may be subjected to various communication network safeguards, such as time constraints, to ensure that other networked devices have fair access to the communication medium.

FIG. 3 illustrates a first exemplary message exchange 300 between two networked devices in accordance with various aspects of the present invention. The exemplary message exchange 300 is provided in the context of the IEEE 802.11 standard. However, by no means, should the scope of various aspects of the present invention be limited to IEEE 802.11 features and implementations.

The top row of the message exchange 300 is labeled "QSTA." This generally refers to a quality of service station in the IEEE 802.11 context. The QSTA may be generally thought of, for this example, as a first networked device that may have power-save capabilities. The bottom row of the message exchange 300 is labeled "QAP." This generally refers to a quality of service access point in the IEEE 802.11 context. The QAP may be generally thought of, for this example, as a second networked device.

Prior to the exemplary message exchange 300, the QSTA gains access to and control of the communication medium. For example, the QSTA may acquire access to the communication medium following a contention-based medium access protocol, such as CSMA/CA.

The message (or packet) exchange 300 begins with a first message 310 sent from the QSTA to the QAP. The first message 310 may, for example, be a Q-Data message with the More flag set. Such an exemplary first message 310 may communicate data to the QAP and also indicate to the QAP, in a power-save scenario, that the QSTA is not currently in a sleep state of a power-save mode.

Following an inter-frame spacing interval (SIFS), the message exchange 300 includes the QAP sending a second message 320 to the QSTA. The second message 320 may, for example, be an acknowledgement message (ACK) to indicate to the QSTA that the QAP successfully received the first message 310.

The message exchange 300 then includes a third message 330 from the QSTA to the QAP. The third message 330 may, for example, be a Q-Data message with the More flag unset. The unset More flag may indicate to the QAP that the QSTA has no more data to send to the QAP. The unset More flag may also, for example, indicate a handoff of control of the communication medium from the QSTA to the QAP.

As discussed previously, the QAP, at this point, may treat power-save devices differently than non-power-save devices. For example, if the QAP determines that the QSTA is not a power-save device, the QAP may merely acknowledge receipt of the third message 330 and cease communicating with the QSTA, thereby releasing the communication medium. Conversely, if the QAP determines that the QSTA is a power-save device, the QAP may accept control of the communication medium from the QSTA, for example, for the communication of information traffic back to the QSTA.

At this point in the exemplary message exchange 300, the QAP assumes control over the communication medium. The QAP responds by sending a fourth message 340 to the QSTA. The fourth message 340 may, for example, be a Q-Data message that includes data for the QSTA and an indication acknowledging receipt of the third message 330.

The exemplary message exchange 300 then includes a fifth message 350 from the QSTA to the QAP, which may, for example, acknowledge receipt of the fourth message 340. The message exchange 300 then includes a sixth message 360 from the QAP to the QSTA, which may, for example, include additional data for the QSTA. The message exchange 300 then includes a seventh message 370 from the QSTA to the QAP, which may, for example, include an indication acknowledging receipt of the sixth message 360.

The exemplary message exchange 300 may continue with the QSTA and the QAP exchanging information, for example, until the QAP exhausts its supply of information to be communicated to the QSTA. Alternatively, for example, the QSTA and QAP may discontinue the message exchange 300 due to expiration of a medium access time limit or other medium access control mechanism, or due to other considerations regarding fairness of access or attempts to guarantee good quality of service to the collection of QSTA within the network.

FIG. 4 illustrates a second exemplary message exchange 400 between two networked devices in accordance with various aspects of the present invention. As with the exemplary message exchange 300 illustrated in FIG. 3, the second exemplary message exchange 400 is provided in the context of the IEEE 802.11 standard. However, by no means, should the scope of various aspects of the present invention be limited to IEEE 802.11 features and implementations.

The top row of the message exchange 400 is labeled "QSTA." This generally refers to a quality of service station in the IEEE 802.11 context. The QSTA may be generally thought of, for this example, as a first networked device that may have power-save capabilities. The bottom row of the message exchange 400 is labeled "QAP." This generally refers to a quality of service access point in the IEEE 802.11 context. The QAP may be generally thought of, for this example, as a second networked device.

Prior to the exemplary message exchange 400, the QSTA gains access to and control of the communication medium. For example, the QSTA may acquire access to the communication medium following a contention-based medium access protocol, such as CSMA/CA.

The message (or packet) exchange 400 begins with a first message 410 sent from the QSTA to the QAP. The first message 410 may, for example, be a Q-Data message with the More flag unset. Such a first message 410 may, for example, indicate to the QAP in a power-save scenario that the QSTA is not currently operating in a sleep state of a power-save mode and is standing by to receive traffic that the QAP may have been buffering for the QSTA while the QSTA was in a sleep state of a power-save mode. The unset More flag may also indicate a handoff of control of the communication medium from the QSTA to the QAP.

As discussed previously, the QAP, at this point, may treat power-save devices differently than non-power-save devices. For example, if the QAP determines that the QSTA is not a power-save device, the QAP may merely acknowledge receipt of the first message 410 and cease communicating with the QSTA, thereby releasing the communication medium. Conversely, if the QAP determines that the QSTA is a power-save device, the QAP may accept control of the communication medium from the QSTA for the communication of information traffic, for example, from the QAP to the QSTA.

At this point in the exemplary message exchange 400, the QAP assumes control over the communication medium. Following an inter-frame spacing interval (SIFS), the message exchange 400 includes the QAP sending a second message 420 to the QSTA. The second message 420 may, for example, include an acknowledgement indication (ACK) to indicate to the QSTA that the QAP successfully received the first message 410.

Additionally, for example, the second message 420 may include a null data frame, which may indicate to the QSTA that the QAP has information traffic buffered for delivery to the QSTA, but that the QAP needs additional time to acquire the information from the buffer. Such a null data frame may, for example, allow the QAP to retain control of the communication medium (e.g., a communication medium controlled by a contention-based medium access control protocol) while the QAP is obtaining the information traffic destined for the QSTA.

The exemplary message exchange 400 then includes a third message 430 from the QSTA to the QAP. The third message 430 may, for example, include an indication to acknowledge receipt of the second message 420 by the QSTA.

The message exchange 400 then includes a fourth message 440 from the QAP to the QSTA, which may, for example, include information for the QSTA that the QAP retrieved from a buffer. The message exchange 400 then includes a fifth message 450 from the QSTA to the QAP, which may, for example, include an indication acknowledging receipt of the fourth message 440.

The message exchange 400 then includes a sixth message 460 from the QAP to the QSTA, which may, for example, include additional information for the QSTA that the QAP retrieved from a buffer. The message exchange 400 then includes a seventh message 470 from the QSTA to the QAP, which may, for example, include an indication acknowledging receipt of the sixth message 460.

The exemplary message exchange 400 may continue with the QSTA and the QAP exchanging information, for example, until the QAP exhausts its supply of information to be communicated to the QSTA. Alternatively, for example, the QSTA and QAP may discontinue the message exchange 400 due to expiration of a medium access time limit or due to some other form of medium access control mechanism, or due to other considerations regarding fairness of access or attempts to guarantee good quality of service to the collection of QSTA within the network.

Figure 5:
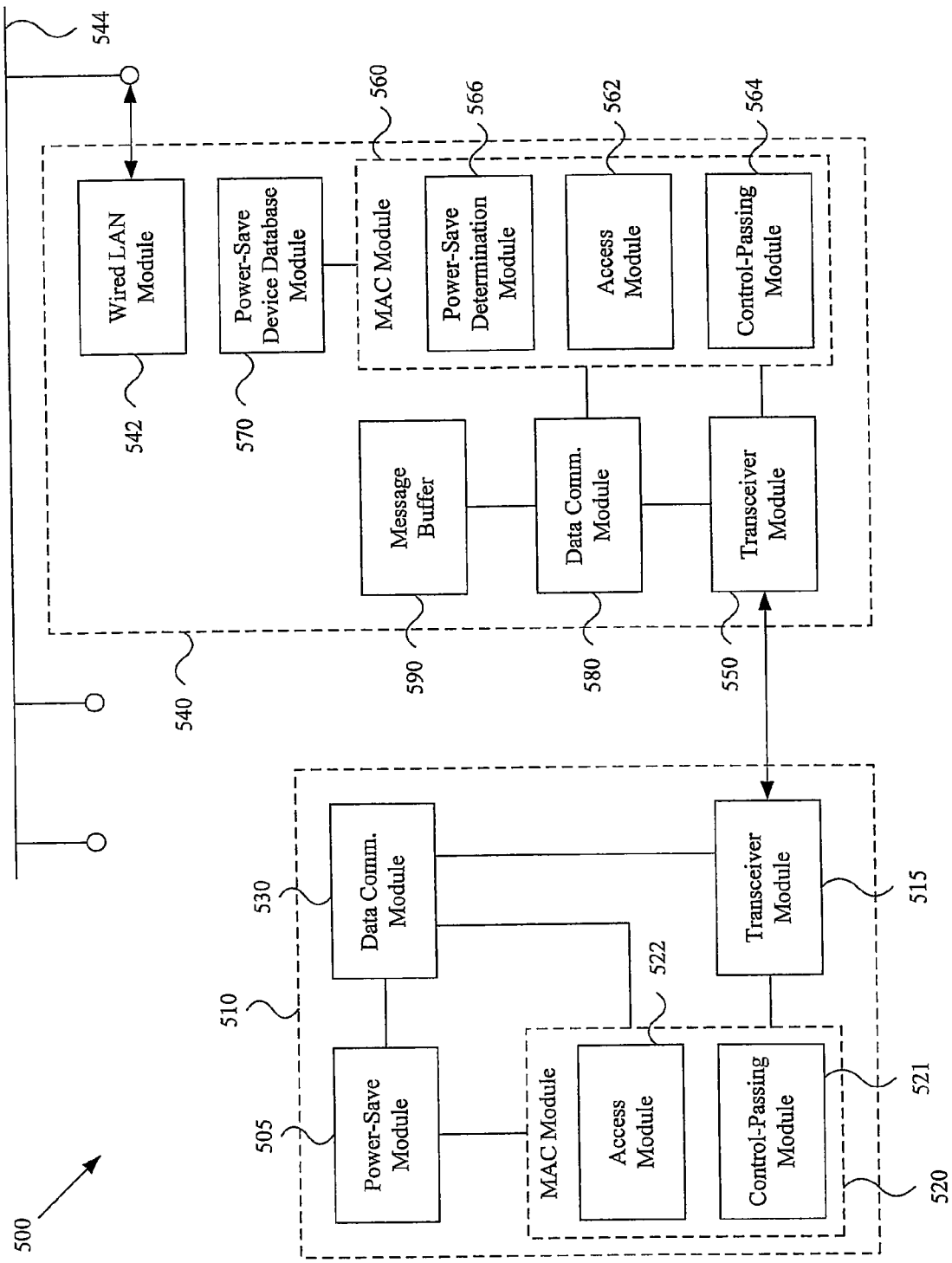
FIG. 5 shows a block diagram of a system for controlling access to and utilizing a communication medium in accordance with various aspects of the present invention.

FIG. 5 shows a block diagram of a system 500 for controlling access to and utilizing a communication medium in accordance with various aspects of the present invention. The system 500 includes a first communication module 510, which may, for example, be utilized by a first networked device. Various components of the first communication module 510 may, for example, perform various aspects of the method 100 illustrated in FIG. 1. The system 500 also includes a second communication module 540, which may, for example, be utilized by a second networked device. Various components of the second communication module 540 may, for example, perform various aspects of the method 200 illustrated in FIG. 2. For the following discussion regarding FIG. 5, a network device utilizing the first communication module 510 may be referred to as the "first device," and a device utilizing the second communication module 540 may be referred to as the "second device."

The first communication module 510 includes a power-save module 505. The power-save module may control the first device entering and exiting a power-save mode. For example, the power-save module 505 may automatically place the first device into a sleep state of a power-save mode when the power-save module 505 detects no user interaction with the first device for a period of time. Also for example, the power-save module 505 may automatically place the first device into a wake state of a power-save mode periodically based on the timeout of a wake-up timer. Alternatively, the power-save module 505 may place the first device in the wake state when the module 505 detects an attempt at user interaction with the first device. Accordingly, the scope of various aspects of the present invention should not be limited to particular characteristics and implementations of power-save functionality.

The first communication module 510 includes a transceiver module 515. The transceiver module 515 may communicate with various network devices over a variety of communication links. For example and without limitation, the transceiver module 515 may communicate with another networked device over a wired link, wireless link, electrical link, radio frequency link, tethered optical link, or non-tethered optical link. Accordingly, the scope of various aspects of the present invention should not be limited by characteristics of a particular type of transceiver or communication link.

The first communication module 510 includes a medium access control (MAC) module 520. The exemplary MAC module 520 is communicatively coupled to the power-save module 505 and the transceiver module 515. The general function of the MAC module 520 is to control access to and control the network communication medium. Such access may include, for example, acquiring access and control of a channel of the communication medium, such as a time slot of a communication medium governed by TDMA, a frequency of a communication medium governed by FDM, a frequency hopping sequence, or a code of a communication medium governed by CDMA. To this end, the MAC module 520 includes a medium access module 522 that performs communication medium access functionality. Alternatively, acquiring access to and control of the network communication medium may include, for example, gaining access to and control of a plurality of communication channels or all of the communication channels.

For example, the medium access module 522 may utilize the transceiver module 515 to acquire access and control of a communication medium by utilizing any of a variety of communication medium access protocols. For example and without limitation, the medium access module 522 may acquire medium access and control according to a carrier sense multiple access with collision avoidance (CSMA/CA) protocol. Alternatively, the medium access module 522 may, for example, acquire access to the communication medium according to an ALOHA or a CSMA/CD protocol. Accordingly, the scope of various aspects of the present invention should not be limited to characteristics of a particular medium access protocol.

The exemplary MAC module 520 also includes a communication medium control-passing module 521. After the medium access module 522 has gained access and control of the communication medium, the control-passing module 521 may pass control of the communication medium to another networked device. Such a networked device may, for example, include a second networked device utilizing the second communication module 540 (the "second device). After the second device receives control of the communication medium from the first device, the second device may then utilize the communication medium without having to perform various medium access activities, such as, for example, contending with other network devices for access and control of the communication medium.

The exemplary MAC module 520 may also communicate to various network devices that the first device has the capability to enter and exit a sleep state of a power-save mode. Other network devices may then utilize this information to govern their treatment of and communication with the first device.

Note that the MAC module 520 may incorporate various safeguards generally associated with medium access, including for example, timeout functions to ensure fair access to the communication medium for all network devices. Thus, the MAC module 520 may include various aspects to ensure that the first device may not control the communication medium for an inappropriate amount of time.

The control-passing module 521 may pass control of the communication medium to another networked device in a variety of ways. For example, the control-passing module 521 may utilize the transceiver module 515 to communicate an explicit message to another device transferring control of the communication medium to the other device. Alternatively, for example, the control-passing module 521 may utilize the transceiver module 515 to communicate a null data frame to another device, thus signifying that the first device is no longer utilizing the communication medium and that the other device may then take control of the communication medium.

The first communication module 510 also includes a data communication module 530 that is coupled to the MAC module 520, the transceiver module 515 and the power-save module 505. After the MAC module 520 gains access to and control of a communication medium, the data communication module 530 may utilize the transceiver module 515 to communicate information to another networked device. For example, in the illustrative system 500 shown in FIG. 5, the data communication module 530 may utilize the transceiver module 515 to communicate with the second device. The data communication module 530 may, for example, utilize the transceiver module 515 to communicate a single packet or a stream of packets to the second device.

The data communication module 530 may also perform various data receiving functions. For example, following transfer of control of the communication from the first device to the second device, the data communication module 530 may utilize the transceiver module 515 to receive information communicated to the first device from the second device, which now has control of the communication medium. Such information may, for example, be in the form of a single data packet or a stream of data packets.

Further, the data communication module 530 may communicate with the power-save module 505 to indicate to the power-save module 505 when communication between the first device and the second device is complete, thereby allowing the power-save module 505 to decide whether to cause the first device to enter a sleep state of a power-save mode.

Various modules of the first communication module 510 may, for example, be incorporated into a single integrated circuit. Various modules may include hardware, software, or combinations thereof. Various modules may also share components of the communication module 510, such as, for example, a microprocessor, memory devices, bus infrastructure, clocks, etc. Accordingly, the scope of various aspects of the present invention should not be limited to particular arrangements and implementations of the various modules discussed.

Though not illustrated in FIG. 5, the first communication module 510 may also include various user interface modules, which may, for example, indicate to the user whether the device is in a power-save mode. The various user interface modules may also indicate to a user that the device has recently received updated information. Such modules may provide the user with the ability to tailor user interface interaction with the device in the manner best suited to the individual user. Accordingly, the scope of various aspects of the present invention should by no means be limited to various user interface modes, functions or features.

The second communication module 540 is illustrated connected to a wired LAN 544 through a wired LAN module 542. The second communication module 540 may, for example, be utilized in a network access point device. However, the scope of various aspects of the present invention should not be limited to a particular type of network device.

The second communication module 540 includes a transceiver module 550. The transceiver module 550 may communicate with various network devices over a variety of communication links. For example and without limitation, the transceiver module 550 may communicate with another networked device over a wired link, wireless link, electrical link, radio frequency link, tethered optical link, or non-tethered optical link. Accordingly, the scope of various aspects of the present invention should not be limited by characteristics of a particular type of transceiver or communication link.

The second communication module 540 also includes a MAC module 560, which is communicatively coupled to the transceiver module 550. Similar to the MAC module 520 discussed previously with respect to the first communication module 510, the exemplary MAC module 560 includes a medium access module 562. The medium access module 562 may, for example, share various aspects with the medium access module 522 discussed with regard to the first communication module 510.

The MAC module 560 also includes a control-passing module 564. The control-passing module 564 may utilize the transceiver module 550 to receive a message from the first device passing control of the communication medium from the first device to the second device. Having acquired control of the communication medium in this manner, the MAC module 560 may access and control the communication medium without having to perform various medium access activities. For example, if access to the communication medium is generally governed by a contention-based medium access protocol, such as, for example, CSMA/CA, the MAC module 560 may acquire control directly from the first device, thereby by-passing the need to contend with other network devices for access to the communication medium.

The second communication module 540 also includes a data communication module 580 that is communicatively coupled to the transceiver module 550 and the MAC module 560. The data communication module 580 may, for example, utilize the transceiver module 550 to receive information from networked devices. The data communication module 580 may also, for example, utilize the transceiver module 550 to communicate information to other networked devices.

For example, prior to the MAC module 560 gaining control of the communication medium from the first device passing control of the communication medium to the second device, the data communication module 580 may utilize the transceiver module 550 to receive information from the first device. Such information may include data and/or control information, and may also include a medium access hand-off message. Such a medium access hand-off message may also, for example, be a stand-alone message.

Also for example, subsequent to the MAC module 560 gaining control of the communication medium from the first device passing control of the communication medium to the second device, the data communication module 580 may utilize the transceiver module 550 to communicate information back to the first device. In the illustrative example of the second device being a network access point device, the access point device may have been storing information destined for the first device in a buffer and awaiting instructions from the first device or an indication that the first device is not in a sleep state of a power-save mode.

The data communication module 580 is shown communicatively coupled to a message buffer 590, in which may be stored information destined for the first device. The data communication module 580 may retrieve such information from the message buffer 590 and utilize the transceiver module 550 to communicate the information to the first device. The data communication module 580 may, for example, communicate such information to the first device by communicating a single data packet or a stream of data packets to the first device, while the MAC module 560 maintains control of the communication medium. Note that the message buffer 590 may be incorporated into the second communication module 540 or not. For example, the message buffer 590 may be at another location accessible on the wired LAN 544.

The second communication module 540 includes a power-save device database module 570, which is communicatively coupled to the power-save determination module 566 of the MAC module 560. The power-save determination module 566 (e.g., in coordination with the control-passing module 564) may utilize the information in the power-save device database module 570 to determine if a received medium control hand-off message was transmitted by a network device with power-save capability. For example, the second communication module 540 may respond to such a message differently depending on the message source. For example, the second communication module 540 may decide not to accept control of the communication medium in response to messages received from networked devices that do not have power-save capability. Conversely, the second communication module 540 may, for example, always accept control of the communication medium in response to medium control hand-off messages received from networked devices that are power-save devices.

Various modules of the second communication module 540 may, for example, be incorporated into a single integrated circuit. Various modules may include hardware, software, or combinations of hardware and software. Various modules may also share components of the second communication module 540, such as, for example, a microprocessor, memory devices, bus infrastructure, clocks, etc. Accordingly, the scope of various aspects of the present invention should not be limited to particular arrangements and implementations of the various modules discussed.

Figure 6:
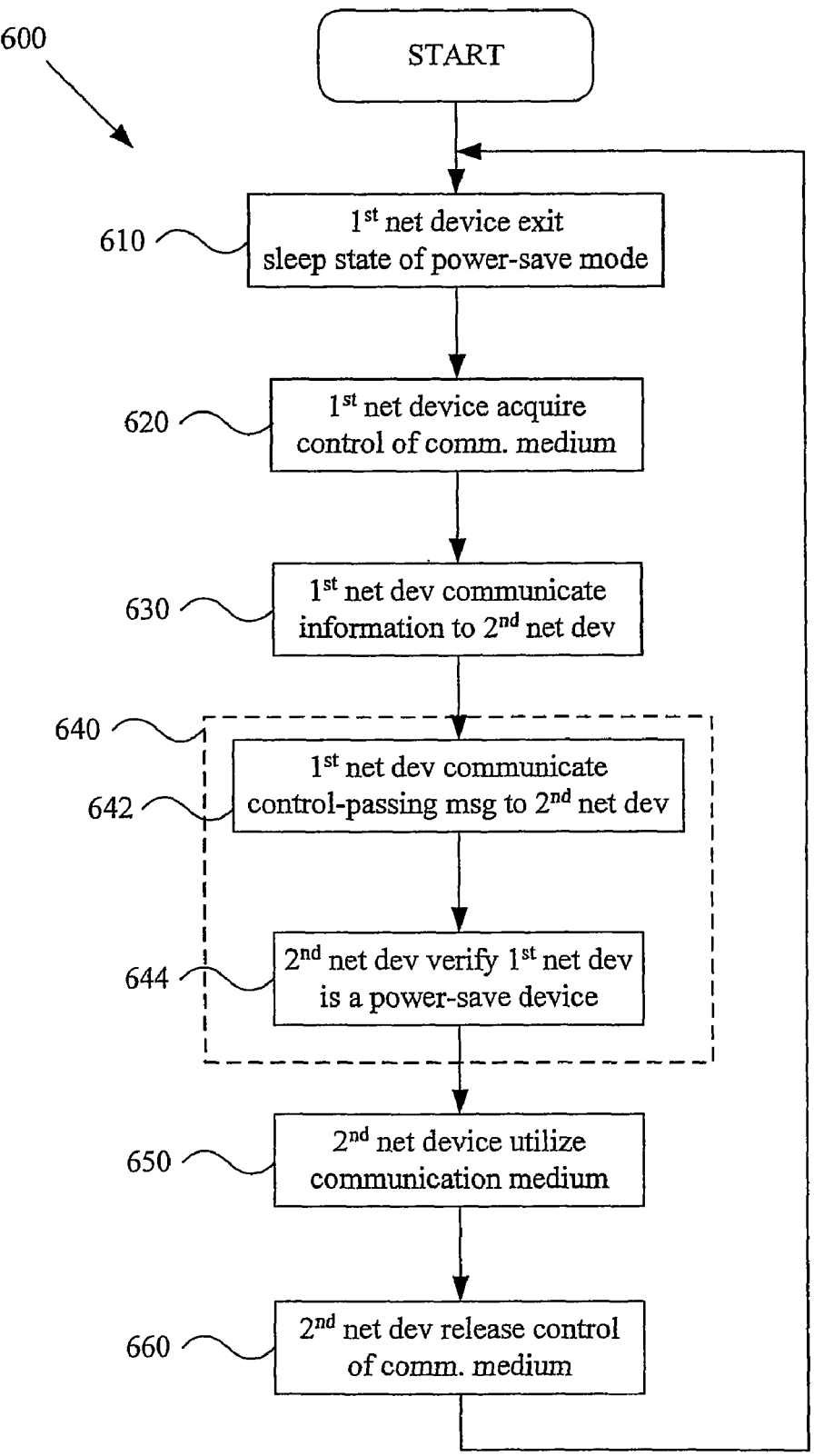
FIG. 6 shows a flow diagram of a method for controlling access to a communication medium in accordance with various aspects of the present invention.

FIG. 6 shows a flow diagram of a method 600 for controlling access to a communication medium in accordance with various aspects of the present invention. The exemplary method 600 is presented in the context of a communication network having a networked device with power-save capability. However, the scope of various aspects of the present invention should, by no means, be limited to characteristics of such power-save devices or a network having such devices. Additionally, the exemplary method 600 may incorporate various aspects of the exemplary methods 100, 200 shown in FIGS. 1 and 1 and discussed previously.

The method 600, at step 610, includes a first networked device exiting a sleep state of a power-save mode. The first networked device may exit the sleep state of the power-save mode for a variety of reasons, including but not limited to, user activity or timer activity. In an alternative scenario, for example, the first networked device may complete some other activity with which it was pre-occupied.

The method 600, at step 620, then includes the first networked device gaining access to and control of the network communications medium. As discussed previously such access and control may, for example, correspond to one or more channel, frequency, timeslot, frequency hopping pattern, or code. The first networked device may, for example, utilize a contention-based medium access protocol (e.g., CSMA/CA) to gain access to the communication medium.

The method 600, at step 630, includes the first networked device utilizing the communication medium to communicate information to a second networked device. The second networked device may be, for example, an access point device in a wireless network. Alternatively, the second networked device may be, for example, a peer device. Accordingly, the scope of various aspects of the present invention should, by no means, be limited to characteristics of particular devices or networks.

Step 630 may include the first networked device communicating information to the second networked device in a data packet or a plurality of data packets. In an exemplary scenario, where after acquiring access to and control of the communication medium at step 620, the first networked device has no information to communicate to the second networked device, the first networked device may by-pass step 630.

The method 600, at step 640, includes passing control of the communication medium from the first networked device to a second networked device. The second networked device may, for example, be the same networked device to which the first networked device communicated information in step 630. The second networked device, having thereby gained control of the communication medium, may then utilize the communication medium without having to follow the medium access protocol generally governing access to the communication medium. For example and without limitation, in a scenario where access to the communication medium is generally governed by a contention-based medium access control protocol (e.g., CSMA/CA), the second networked device may utilize the communication medium without having to contend with other networked devices for access to the communication medium.

Step 640 is illustrated having two exemplary sub-steps. Step 642 includes the first networked device communicating a medium control hand-off message to the second networked device. The medium control hand-off message may, for example, notify the second networked device that the second networked device may have control over the communication medium. The medium control hand-off message may have a variety of forms. For example, the hand-off message may be a stand-alone message or may be a flag in a multi-purpose message. For example, the hand-off message may be a flag in a packet containing data and/or control information, which may be set to indicate to the receiving device that the sending device has no data or no more data to send.

Step 644 includes the second networked device, which received the hand-off message, verifying that the first networked device is a power-save device. In the exemplary method 600, the second networked device may distinguish between power-save and non-power-save devices. For example, the second networked device may only accept a medium control hand-off from a power-save device and not from a non-power-save device. Note that allowing hand-off from a power-save device and not allowing hand-off from a non-power-save device is an exemplary scenario and should, by no means, limit the scope of various aspects of the present invention.

Step 644 may include, for example, the second networked device analyzing messages from the first networked device to determine whether the first networked device is a power-save device. Alternatively, the second networked device may access a database of known power-save devices to determine if the first networked device is a power-save device. The second networked device may perform such verification in a variety of ways, and the scope of various aspects of the present invention should not be limited by characteristics of particular verification mechanisms.

The method 600, at step 650, includes the second networked device, having acquired control over the communication medium at step 640, utilizing the communication medium to communicate information. For example, the second networked device may communicate information back to the first networked device.

In an exemplary power-save scenario, the second networked device may have stored traffic destined for the first networked device in a buffer, waiting for an indication that the first networked device is not in a sleep state of a power-save mode. The second networked device may then, for example, having received an indication that the first networked device is not in a sleep state of a power-save mode, and having just received control of the communication medium from the first networked device, retrieve such stored information from the buffer and utilize the communication medium to communicate the retrieved information to the first networked device.

Step 650 may include, for example, communicating information to the first networked device, or other networked device, using a single packet or a stream of packets. Step 650 may include communicating such information over the communication medium while maintaining control over the communication medium. The method 600 thereby provides a mechanism whereby a first and second networked device may communicate information with each other following only one successful acquisition of access to and control of the communication medium.

The method 600, at step 660, includes the second networked device releasing control of the communication medium. Step 660 may include, for example, the second networked device communicating a message explicitly indicating that the second networked device is releasing control of the communication medium. Alternatively, for example, step 660 may include the second networked device discontinuing its utilization of the communication medium. Accordingly, the scope of various aspects of the present invention should not be limited by characteristics of particular mechanisms for releasing control of the communication medium.

Note that the medium access control for the communication medium may include safeguards to keep a networked entity or set of networked entities from controlling the communication medium for an inappropriate period of time. For example, the medium access protocol may include an upper time limit on the time that a device or group of devices may maintain uninterrupted control of the communication medium.

In summary, a system and method are provided for accessing, controlling and utilizing a communication medium in a network. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a first networked device having capability to enter and exit a power saving mode, a method for controlling access to a communication medium, the method comprising:
    exiting a sleep state of the power-saving mode;
    acquiring control of a communication medium in a communication network utilizing a contention-based medium access protocol;
    transmitting by the first networked device, at least one message to a second networked device, wherein the at least one message comprises information that indicates a request for pass of control of the communication medium from the first networked device to the second networked device; and
    receiving a plurality of packets by the first networked device from the second networked device, wherein the second networked device is configured to acquire control of the communication medium from the first networked device in response to the request for pass of control without requesting the contention-based medium access protocol to access the communication medium when the first networked device has power saving capability.

2. The method of claim 1, wherein the second networked device is capable of communicating the plurality of packets via said communication network over a plurality of communication media, the plurality of communication media comprising the communication medium and at least one other communication medium.

3. The method of claim 1, wherein in response to the request for pass of control of the communication medium, the second networked device is operable to transmit the plurality of packets to the first networked device via said communication network over the communication medium without having to utilize the contention-based medium access protocol to access the communication medium.

4. The method of claim 1, where the first networked device and the second networked device are directly coupled by the communication medium.

5. The method of claim 1, wherein the at least one message comprising information that indicates a request for pass of control of the communication medium at least one message that indicates the first networked device has completed transmission to the second networked device.

6. The method of claim 1, wherein the at least one message is communicated over the communication medium.

7. The method of claim 1, wherein said acquiring control of a communication medium comprises acquiring control of a channel of the communication medium.

8. The method of claim 1, wherein said acquiring control of a communication medium comprises acquiring control of a timeslot of the communication medium.

9. The method of claim 1, comprising, after said acquiring control of the communication medium and before said transmitting at least one message to the second networked device, wherein the at least one message comprises information that indicates a request for pass of control, communicating data to another networked device via said communication network over the communication medium.

10. The method of claim 1, where the second networked device provides a computer network interface to the first networked device.

11. The method of claim 1, where the second networked device communicates the plurality of packets to the first networked device through at least one computer network communication link 12. The method of claim 1, where the second networked device communicates with the first networked device through at least a wireless LAN communication link.

13. The method of claim 1, where the second networked device communicates with the first networked device through at least a computer network communication medium.

14. The method of claim 1, where the second networked device provides an interface between a computer communication network and a second network.

15. The method of claim 14, where the second network is a computer communication network.

16. Electrical circuitry for use in a first networked device, the electrical circuitry comprising:
    at least one module that is configured to, at least:
        wake the networked device from a sleep state of a power-save mode;
        after waking the networked device from the sleep state of the power-save mode, acquire control of a communication medium for communicating via a communication network utilizing a contention-based medium access protocol; and
        after acquiring control of the communication medium for communicating via said communication network, transmit at least one message comprising information to pass control of the communication medium from the first networked device to a second networked device, where in response to the passed communication medium control the second networked device is operable to communicate a plurality of packets to the first networked device via said communication network without having to utilize the contention-based medium access protocol to access the communication medium.

17. The electrical circuitry of claim 16, wherein the at least one module comprises a transceiver module, a power-save module, and a medium access control (MAC) module.

18. The electrical circuitry of claim 16, where in response to the passed communication medium control the second networked device is configured to communicate information contained in the plurality of packets via said communication network over a plurality of communication media, the plurality of communication media comprising the communication medium and at least one other communication medium.

19. The electrical circuitry of claim 16, where in response to the passed communication medium control the second networked device is configured to transmit the plurality of packets to the first networked device via said communication network over the communication medium without having to utilize the contention-based medium access protocol to access the communication medium.

20. The electrical circuitry of claim 16, wherein the at least one module is configured to receive a plurality of packets communicated via said communication network over the communication medium from the second networked device.

21. The electrical circuitry of claim 16, wherein the at least one module is operable to interface with the second networked device, the second networked device providing an interface between a computer communication network and a second network.

22. The electrical circuitry of claim 16, wherein after the at least one module acquires control of the communication medium for communicating via a communication network and before the at least one module operates to transmit at least one message to the second networked device, the at least one module is configured to communicate data to another networked device via said communication network over the communication medium.

23. A method for an access point operable in a wireless local area network, comprising:
   receiving an initial packet from a first device over a communication medium in the WLAN;
   receiving another packet from the first device indicating a request to pass control of the communication medium in the WLAN to the access point;
   determining whether the first device includes a power save mode capability;
   in response to determining that the first device includes a power save mode capability, accepting control of the communication medium and transmitting at least one packet to the first device over the communication medium;
   in response to determining that the first device fails to include power save mode capability, not accepting the request to pass control of the communication medium from the first device and requesting access to the communication medium from a contention based medium access control protocol for the WLAN.

24. The method of claim 23 wherein determining whether the first device includes a power save mode capability comprises:
   accessing a database that indicates whether devices registered in the WLAN include power-save capability.

25. The method of claim 23 wherein determining whether the first device includes a power save mode capability comprises:
   receiving an indication of power-save capability from the first device.

26. The method of claim 23 wherein in response to determining that the first device includes a power save mode capability, accepting control of the communication medium and transmitting at least one packet to the first device over the communication medium comprises:
   determining whether buffered data for the first device is stored in a message buffer;
   when the message buffer includes buffered data for the first device, accepting control of the communication medium;
   retrieving the buffered data for the first device and transmitting the at least one packet to the first device over the communication medium with the buffered data; and
   releasing control of the communication medium in accordance with the contention based medium access control protocol for the WLAN.

* * * * *